United States Patent
Hsieh et al.

(10) Patent No.: US 7,121,694 B2
(45) Date of Patent: Oct. 17, 2006

(54) BACK LIGHT UNIT WITH HIGH HEAT TRANSFER RATE

(75) Inventors: Chin-Kun Hsieh, Hsin-Chu (TW); Chuan-Pei Yu, I-Lan Hsien (TW); Han-Chou Liu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 161 days.

(21) Appl. No.: 10/604,590

(22) Filed: Aug. 1, 2003

(65) Prior Publication Data
US 2005/0248280 A1 Nov. 10, 2005

(30) Foreign Application Priority Data
Aug. 9, 2002 (TW) .............................. 91118046 A

(51) Int. Cl.
*F21V 7/20* (2006.01)

(52) U.S. Cl. ..................... 362/345; 362/341; 362/355

(58) Field of Classification Search ................ 362/345, 362/341, 355, 356, 29, 30, 97, 241, 246; 361/709, 713, 706, 703, 692, 697, 690; 313/45–47, 313/40, 41, 27; 315/169.3, 169.4
See application file for complete search history.

(56) References Cited

U.S. PATENT DOCUMENTS

| 4,598,347 | A | * | 7/1986 | Peppers ...................... 362/373 |
| 4,652,979 | A | * | 3/1987 | Arima ........................ 362/522 |
| 5,143,433 | A | * | 9/1992 | Farrell ......................... 362/29 |
| 5,993,027 | A | * | 11/1999 | Yamamoto et al. ......... 362/294 |

* cited by examiner

*Primary Examiner*—Tuyet Thi Vo
(74) *Attorney, Agent, or Firm*—Winston Hsu

(57) ABSTRACT

A backlight unit with high heat transfer rate disposed under a display panel. The backlight unit includes a light source generator for generating light beams, a diffusing plate positioned between the light source generator and the display panel for scattering the light beams to the display panel, and a reflecting sheet position under the light source generator for reflecting the light beams upward. The reflecting sheet has at least one opening for increasing the heat transfer rate of the backlight unit.

16 Claims, 6 Drawing Sheets

BACK LIGHT UNIT WITH HIGH HEAT TRANSFER RATE

BACKGROUND OF INVENTION

1. Field of the Invention

The present invention relates to a back light unit of a display panel, and more particularly, a back light unit having a high heat transfer rate.

2. Description of the Prior Art

A back light unit, which is a key element in the fabrication of liquid crystal displays, is widely used in digital cameras, PDAs, vehicle satellite navigation systems, computer monitors, flat panel TVs, and so on. Typically, a back light unit, which is generally installed underneath a display panel, comprises a light source (or multiple light sources) and a light diffusion plates for providing users with diffused and uniform light beams. Light beams penetrate the overlying display panel and form various images controlled by pixel electrodes densely arranged on the display panel. Back light units are typically divided into two major categories: direct-type, in which the light source is generated form underneath the display panel directly, and edge light type, in which the light source generator is located adjacent to the edge of the display panel. The direct-type backlight unit can provide higher intensity of light and is thus more suited for large size display panels such as computer monitors and TV panels than the edge light type.

Please refer to FIG. 1 of a cross-sectional view of a conventional back light unit 10. The back light unit 10 is installed underneath a display panel 12 and comprises a light source generator 14, a diffusing plate 16 interposed between the light source generator 14 and the display panel 12, and a reflecting sheet 18 disposed under the light source generator 14 and fixed on a housing 20. The light source generator 14 is used to provide a light source to the display panel 12. The reflection plate 18 is used to reflect light generated by the light source generator 14 upward to the overlying diffusing plate 16, thereby increasing light use efficiency of the back light unit 10 and obtaining a better brightness output. The diffusing plate 16 is used to diffuse light (or reflected light) by means of shielding, scattering, or refraction so as to provide a uniform light to the display panel 12. The housing 20, which is disposed beneath the reflecting sheet 18 and surrounding the reflecting sheet 18, is used to fix the diffusing plate 16, the reflecting sheet 18, and the light source generator 14. In addition, a diffusing sheet 22 and an optic focusing film 24 are typically provided above the diffusing plate 16 for enhancing the back light unit 10 so as to output light beams with uniform luminous intensity to the display panel 12. The number and the position of the diffusing sheet 22 and the optical focusing film 24 can be varied according to the requirements of the products.

The light source generator 14 in the back light unit 10 is typically composed of a plurality of light tubes. To meet the requirements of high brightness and low weight, the aforementioned light source generator 14 is often installed in a closed chamber which is very narrow and small. Thus, the heat generated during operation accumulates rapidly, leading to a high temperature near the light tubes after operating for a period of time. The high temperature interferes with the normal operation of the display panel 12 and deteriorates the display performance. For example, distortion easily occurs on the screen. This leads to a decrease in the lifetime of devices nearby.

Consequently, there is a strong need to provide a back light unit with a high heat transfer rate to improve the display performance and lengthen the lifetime of devices in the back light unit.

SUMMARY OF INVENTION

It is an object of the claimed invention to provide a back light unit with a high heat transfer rate to solve the above-mentioned problems.

According to the claimed invention, a back light unit with a high heat transfer rate is disclosed. The back light unit disposed under a display panel comprises a light source generator, a diffusing plate positioned on the light source generator, and a reflecting sheet positioned underneath the light source generator for reflecting the generated light beams upward to the diffusing plate. The diffusing plate is used to diffuse the light beams in advance to provide a uniform light to the display panel. The reflecting sheet comprises at least one opening or an uneven structure to improve the heat transfer rate of the back light unit.

According to the claimed invention, the reflecting sheet in the back light unit comprises at least one opening or an uneven structure so as to improve the heat transfer rate effectively and avoid heat from accumulating in the light source generator nearby, so as to improve the display performance of the display panel and lengthen the lifetime of devices.

These and other objectives of the present invention will no doubt become obvious to those of ordinary skill in the art after having read the following detailed description of the preferred embodiment which is illustrated in the various figures and drawings.

DETAILED DESCRIPTION

Figure 1:
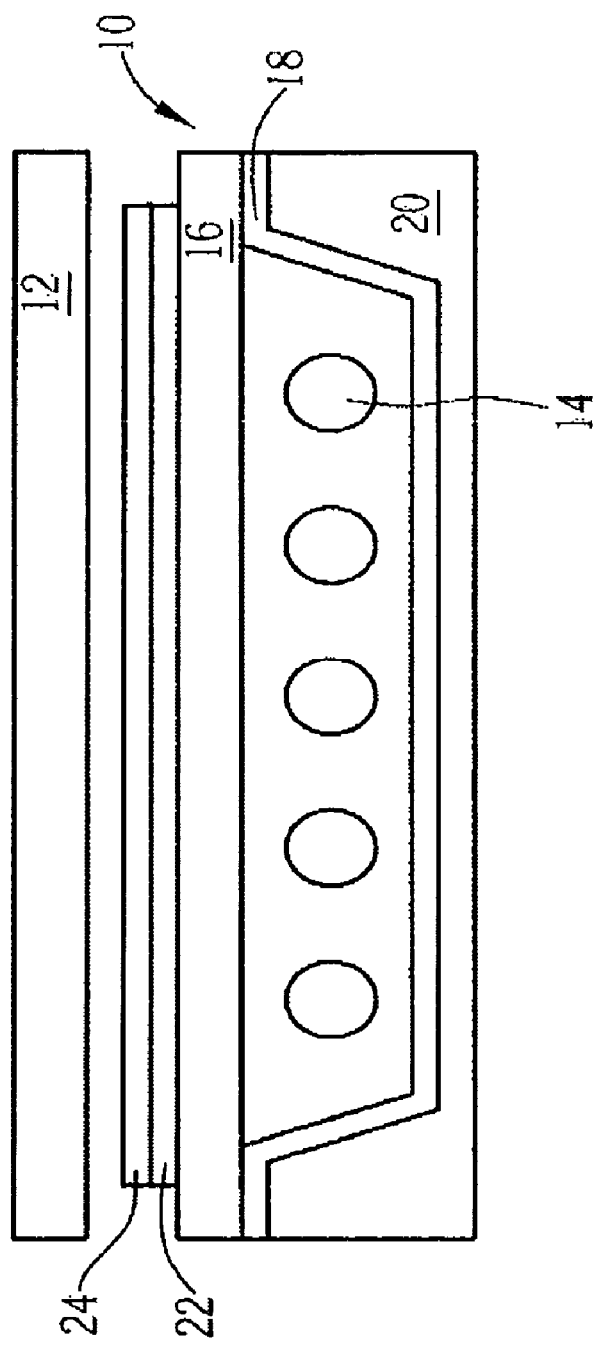
FIG. 1 is a cross-sectional view of a conventional back light unit.
Figure 2:
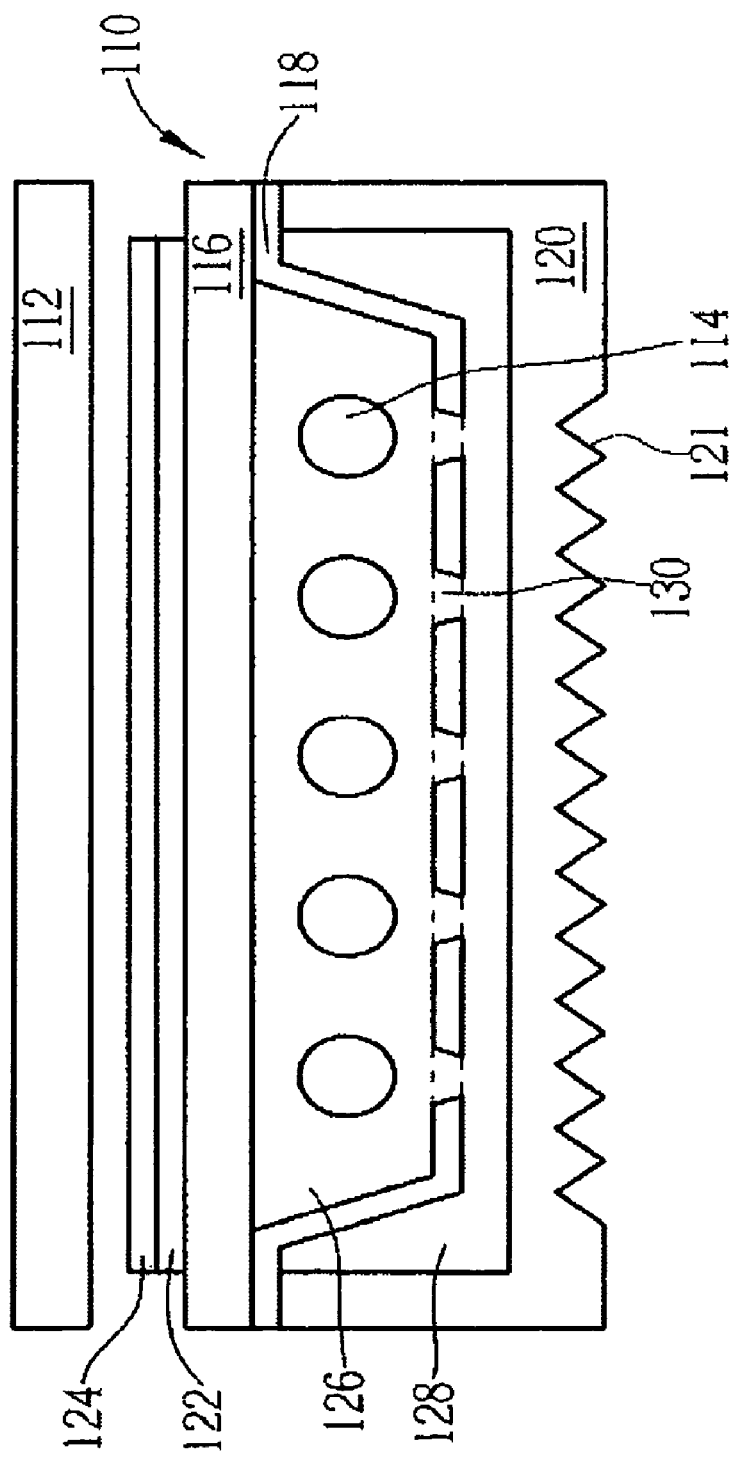
FIG. 2 is a cross-sectional view of a back light unit according to a first embodiment of the present invention.

Please refer to FIG. 2 of a cross-sectional diagram of a back light unit 110 according to a first embodiment of the present invention. As shown in FIG. 2, the back light unit 110 is installed underneath a display panel 112 and comprises a diffusing plate 116, a reflecting sheet 118 disposed under the diffusing plate 116, and a light source generator 114 in a chamber 126 surrounded by the diffusing plate 116 and the reflecting sheet 118. In the preferred embodiment of the present invention, the back light unit 110 further comprises a housing 120 installed under the reflecting sheet 118 and surrounding the reflecting sheet 118 to form a chamber 128.

As the aforementioned description of the conventional back light unit 10, the light source generator 114 is similarly composed of a plurality of light tubes. There is no limitation in the types, shapes, and the arranged method of the light tubes. In the first preferred embodiment of the present invention, the light source generator 114, which is composed of a plurality of cold cathode fluorescent lamps (CCFLs), is arranged in parallel and positioned in the first chamber 126. The reflecting sheet 118 has a horizontal bottom surface and an inclined side surface. The reflecting sheet 118 is normally made of metals such as aluminum, alloys, or materials of foamed PET film, or PC resins with a reflecting film, which is made of metals or other materials of high reflection rate, coated thereon.

The reflecting sheet 118 of the present invention further comprises at least one opening 130. Therefore, the heat in the first chamber 126 can be transferred to the second chamber 128 by convection through the opening 130 and then to the housing 120. This leads to the light source generator 114 disposed in the first chamber 126 being capable of being operated substantially in an equi-temperature environment, thereby prolonging the lifetime of devices and improving the display performance. The interval between the reflecting sheet 118 and the housing 120 may be in a range from few millimeters to several centimeters. In addition, the housing 120 is preferably made of materials having high thermal conductivity, for example, metals or alloys such as aluminum, copper, magnesium, titanium, or silver, or polymer composite materials. The surface of the housing 120 may have a plurality of uneven structures 121 to increase the surface area of the housing 120 for improving the heat-dissipating effect of the back light unit 110. As shown in FIG. 2, V-shaped uneven structures 121 are illustrated. However, other shapes or positions of the uneven structure 121 can be used without any limitation, such as a fin-shaped structure.

Figure 3:
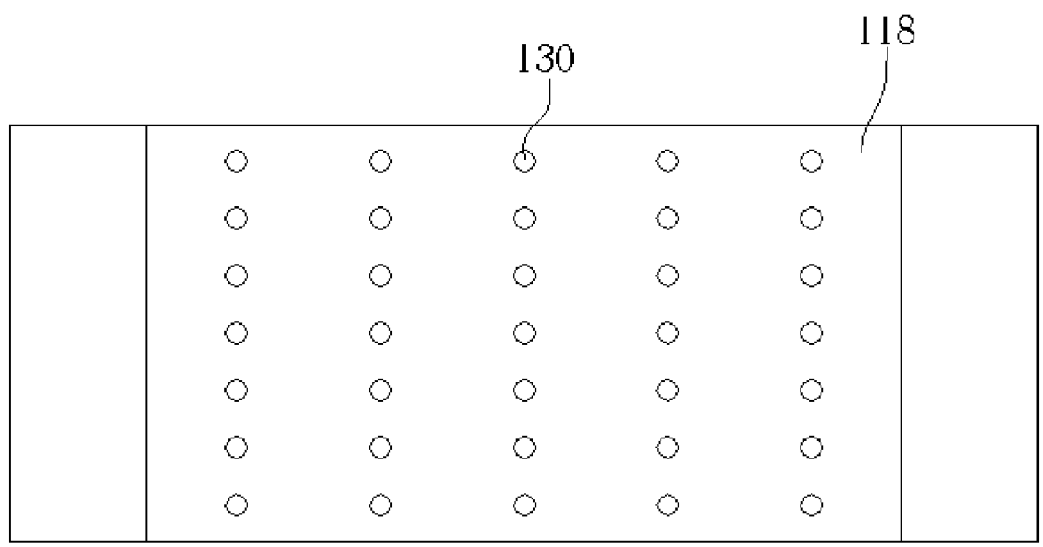
FIG. 3 is a top view of a reflecting sheet shown in FIG. 2.

Please refer to FIG. 3 of a top view of the reflecting sheet 118 in FIG. 2. As shown in FIG. 3, the reflecting sheet 118 comprises a plurality of openings 130. The openings 130 can have different shapes, sizes, and locations according to the requirements of products and is not limited by the disclosed drawing of the present invention. For avoiding the light from being lost after being reflected, thereby leading to decrease the luminous intensity of the reflected light, the openings are preferably disposed directly under the light source generator 114, and the width of each opening 130 is less than a half of the diameter of the light tube of the light source generator 114 so that the light loss can be prevented effectively. Since the housing 120 underlying the reflecting sheet 118 is made of metals, most of the light beams passing through the openings 130 are reflected back to the diffusing plate 116. Furthermore, the openings 130 may be tapered holes having a larger diameter facing the first chamber 126 and a smaller diameter facing the second chamber 128. With these tapered holes, the total reflection area across the reflecting sheet 118 is increased so as to increase light use efficiency.

Figure 4:
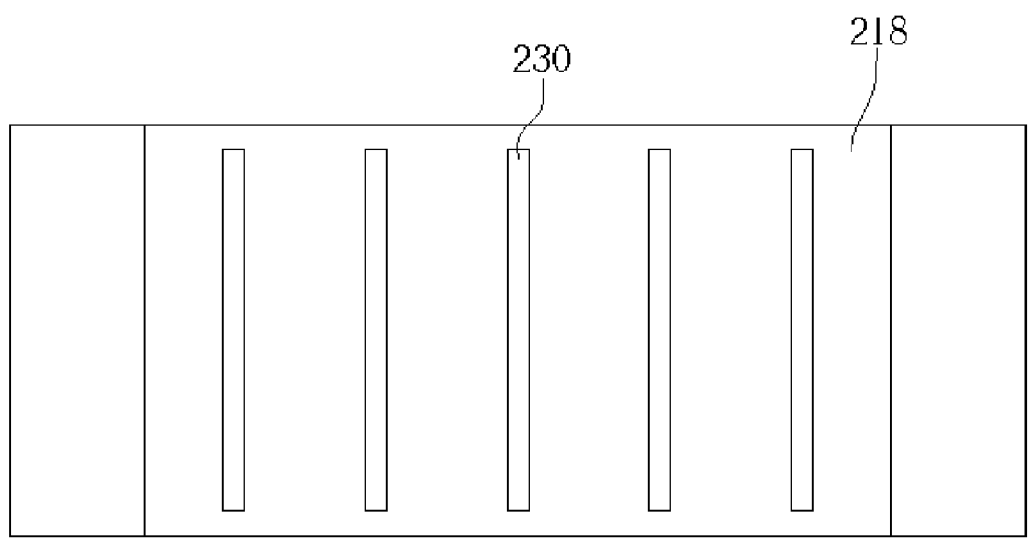
FIG. 4 is a top view of a reflecting sheet in FIG. 2 according to another preferred embodiment of the present invention.

Please refer to FIG. 4 of a top view of a reflecting sheet 218 according to another preferred embodiment of the present invention. As shown in FIG. 4, the reflecting sheet 218 comprises a plurality of slot-type openings 230. As mentioned above, the slot-type openings 230 are also preferably disposed directly under the light source generator 114 and have a shape corresponding to the light source generator 114. The width of the slot-type opening 230 is less than a half of the diameter of the light tube in the light source generator 114 and the slot-type openings 230 may have an inclined side surface so as to increase the light use efficiency.

Figure 5:
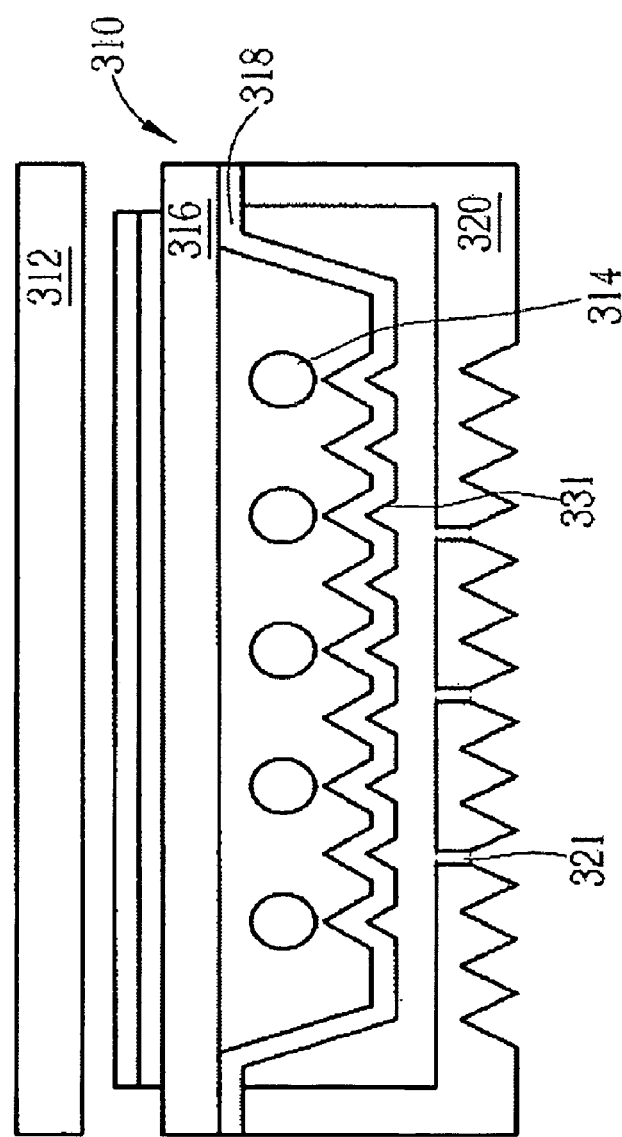
FIG. 5 is a cross-sectional diagram of a back light unit according to another preferred embodiment of the present invention.

Please refer to FIG. 5 of a cross-sectional diagram of a back light unit 310 according to another preferred embodiment of the present invention. As shown in FIG. 5, the back light unit 310 is disposed under a display panel 312 and comprises a diffusing plate 316, a reflecting sheet 318, a light source generator 314, and a housing 320. In this embodiment of the present invention, the reflecting sheet 318 comprises a plurality of uneven structures 331 to increase the reflection rate of the reflecting sheet 318 and the heat transfer area so as to improve the heat-dissipating ability of the reflecting sheet 318. As mentioned above, although there is no limitation in the shapes or positions of the uneven structure 331 by using the uneven structure to increase heat transfer area, the uneven structures 331 are preferably disposed directly under the light source generator 314. In addition, the surface of the housing 320 can further comprise a plurality of heat-dissipating holes 321 to increase the heat transfer rate of the back light unit 310. The structure and function of other devices in the back light unit 310 are similar to the aforementioned embodiment and are not described again.

Figure 6:
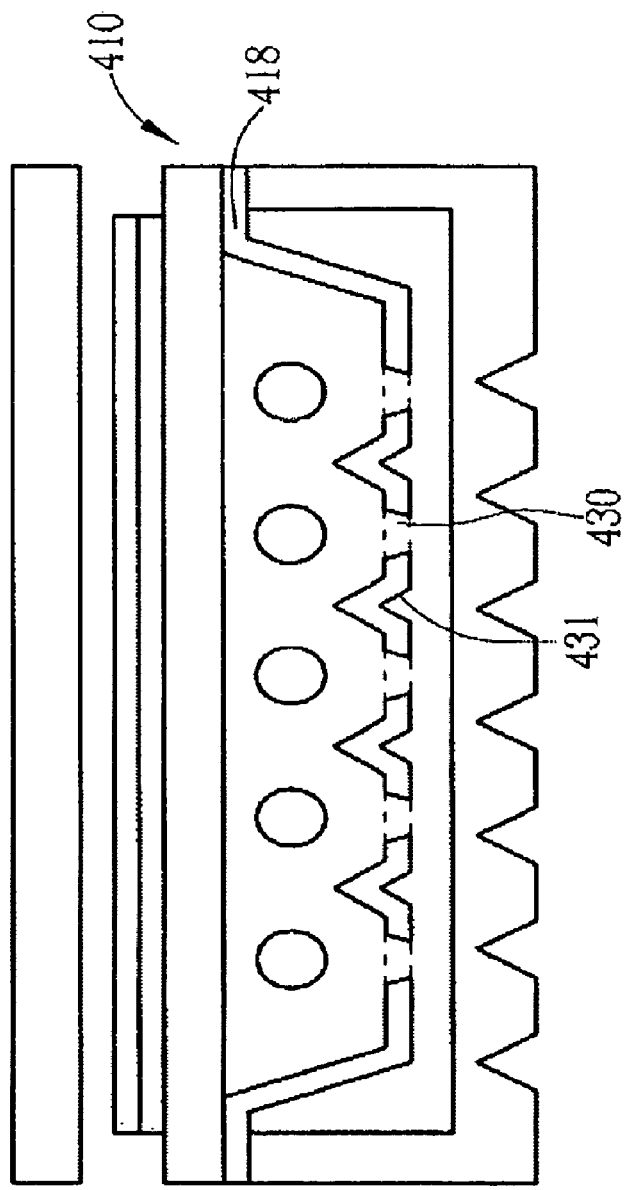
FIG. 6 is a cross-sectional diagram of a back light unit according to another preferred embodiment of the present invention.

Please refer to FIG. 6 of a cross-sectional diagram of a back light 410 according to another preferred embodiment of the present invention. As shown in FIG. 6, the reflecting sheet 418 comprises a plurality of openings 430 and uneven structures 431. Thus, the heat transfer rate of the back light unit 410 is improved because of enhancing the convection effect and increasing the heat transfer area of the reflecting sheet 418. There is also no limitation in the shapes or the locations of the uneven structure 431 to meet the requirement of increasing the heat transfer area of the reflecting sheet 418. Each of the openings 430 may be a slot-type opening or a plurality of holes as indicated in FIG. 3 and FIG. 4. As mentioned above, the openings 430 are preferably disposed directly under the light source generator and the width of each opening is preferably less than the diameter of the light tube in the light source generator for reducing the decrease of brightness. In addition, although the openings 430 are illustrated in the bottom of the uneven structure 430, the combination of the openings 430 and the uneven structures 431 is not limited thereto, but can be carried out in different ways. For example, while the uneven structures 431 are disposed directly under the light source generator, the openings 430 can be disposed on the top of the uneven structure 431.

In contrast to the prior art back light unit, it is advantageous to use the present invention to solve the problem of a poor heat transfer rate in the conventional back light unit due to the significant improvement of heat dissipation caused by the openings or the uneven structures disposed on the reflecting sheet or the housing. Therefore, the nearby environment of the light source generator can be maintained under an equi-temperature condition while operating so as to improve the display performance and lengthen the lifetime of devices. Further, with the use of the uneven structures and the tapered holes, the reflection area of the reflecting sheet can be increased so as to improve the light use efficiency.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A back light unit with high heat transfer rate disposed under a display panel, the back light unit comprising;
   a light source generator for providing a light source;

a diffusing plate interposed between the light source generator and the display panel for scattering the light source generated from the light source generator to the display panel;

a reflecting sheet disposed under the light source generator for reflecting the light source upward to the diffusing plate, the reflecting sheet comprising at least one opening for improving a heat transfer rate of the back light unit; and a housing disposed under the reflecting sheet and surrounding the reflecting sheet, wherein the housing comprises a plurality of heat dissipating holes.

2. The back light unit of the claim 1 wherein the opening is disposed directly under the light source generator.

3. The back light unit of the claim 1 wherein the opening on the reflecting sheet is a slot, a shape of the slot corresponding to a shape of the light source generator.

4. The back light unit of the claim 1 wherein the reflecting sheet comprises at least one uneven structure for increasing the reflection rate and heat transfer area of the reflecting sheet.

5. The back light unit of the claim 1 wherein the reflecting sheet comprises at least one V-shaped structure to increase the reflection rate and heat transfer area of the reflecting sheet.

6. The back light unit of the claim 1 wherein the light source generator comprises at least one light tube.

7. The back light unit of the claim 6 wherein a width of the opening is less than half of a width of the light tube.

8. The back light unit of the claim 6 wherein the light source generator comprises a plurality of light tubes arranged in parallel.

9. The back light unit of the claim 1 wherein the housing comprises at least one uneven structure for increasing the heat transfer area of the back light unit.

10. A back light unit with high heat transfer rate disposed under a display panel, the back light unit comprising:

a light source generator for providing a light source;

a diffusing plate disposed between the light source generator and the display panel for scattering the light source generated from the light source generator to the display panel;

a reflecting sheet disposed under the light source generator to reflect the light source upward to the diffusing plate;

a housing disposed under the reflecting sheet and surrounding the reflecting sheet, wherein the housing comprises a plurality of heat dissipating holes for increasing the heat transfer rate of the back light unit; and wherein the reflecting sheet comprises at least one uneven structure and a plurality of openings to increase heat dissipating efficiency of the reflecting sheet.

11. The back light unit of the claim 10 wherein the openings on the reflecting sheet are disposed in the bottom of the uneven structure.

12. The back light unit of the claim 10 wherein the openings on the reflecting sheet are disposed in the top of the uneven structure.

13. The back light unit of the claim 10 wherein the uneven structure is a V-shaped structure.

14. The back light unit of the claim 10 wherein the housing comprises at least one uneven structure to increase the heat transfer area.

15. The back light unit of the claim 10 wherein the light source generator comprises at least one light tube.

16. The back light unit of the claim 10 wherein the light source generator comprises a plurality of light tubes arranged in parallel.

* * * * *